United States Patent
Otani et al.

(10) Patent No.: US 7,301,695 B2
(45) Date of Patent: Nov. 27, 2007

(54) ANTI-REFLECTIVE FILM AND OPTICAL ELEMENT HAVING ANTI-REFLECTIVE FILM

(75) Inventors: Minoru Otani, Honjo (JP); Ryuji Biro, Utsunomiya (JP); Hirotaka Fukushima, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 11/148,249

(22) Filed: Jun. 9, 2005

(65) Prior Publication Data

US 2005/0280890 A1     Dec. 22, 2005

(30) Foreign Application Priority Data

Jun. 16, 2004  (JP) ............................... 2004-178534

(51) Int. Cl.
*G02B 5/20* (2006.01)
(52) U.S. Cl. ...................... 359/359; 359/588; 359/586; 359/589; 355/71
(58) Field of Classification Search ..................... None
See application file for complete search history.

(56) References Cited

U.S. PATENT DOCUMENTS 6,030,717 A * 2/2000 Nakamura et al. .......... 428/699

(Continued)

FOREIGN PATENT DOCUMENTS

JP        2000206304 A  *  7/2000

(Continued)

OTHER PUBLICATIONS

M. Otani, R. Biro, C. Ouchi, M. Hasegawa, Y. Suzuki, K. Sone, S. Niisaka, T. Saito, J. Saito, A. Tanaka, A. Matsumoto, 'Development of optical coatings for 157-nm lithography. II. Reflectance, absorption, and scatter measurement', Appl. Opt., vol. 41, No. 16, Jun. 1, 2002, pp. 3248-3255.*

(Continued)

*Primary Examiner*—Arnel Lavarias
(74) *Attorney, Agent, or Firm*—Fitzpatrick, Cella, Harper & Scinto

(57) ABSTRACT

In an anti-reflective film including alternating layers of high refractive-index layers and low refractive-index layers, by designing such that a designed central wavelength $\lambda_0$ is within a wavelength range of 141 nm to 189 nm, and that when the first to eighth layers as counted from a substrate have optical film thicknesses d1 to d8 respectively, the equations of:

$0.45\lambda_0 \leq d1 \leq 0.65\lambda_0$;

$0.05\lambda_0 \leq d2 \leq 0.20\lambda_0$;

$0.29\lambda_0 \leq d3 \leq 0.49\lambda_0$;

$0.01\lambda_0 \leq d4 \leq 0.15\lambda_0$;

$0.05\lambda_0 \leq d5 \leq 0.20\lambda_0$;

$0.23\lambda_0 \leq d6 \leq 0.28\lambda_0$;

$0.23\lambda_0 \leq d7 \leq 0.28\lambda_0$; and $0.23\lambda_0 \leq d8 \leq 0.28\lambda_0$ are satisfied, the anti-reflective film can be formed so as to have a low reflectance for a light incident at such a large angle as 30 degrees or more, without increasing the whole thickness of the film.

6 Claims, 9 Drawing Sheets

U.S. PATENT DOCUMENTS

| | | | |
|---|---|---|---|
| 6,472,087 B1 | 10/2002 | Otani et al. | 428/696 |
| 6,590,702 B1 | 7/2003 | Shirai | 359/359 |
| 6,628,456 B2 * | 9/2003 | Takaki et al. | 359/359 |
| 6,947,209 B2 * | 9/2005 | Kanazawa et al. | 359/359 |
| 2003/0218798 A1 * | 11/2003 | Kanazawa et al. | 359/359 |
| 2003/0227670 A1 * | 12/2003 | Taki | 359/355 |
| 2007/0103769 A1 * | 5/2007 | Kuwabara | 359/359 |

FOREIGN PATENT DOCUMENTS

| | | | |
|---|---|---|---|
| JP | 2000352604 A | * | 12/2000 |
| JP | 2001074905 A | * | 3/2001 |
| WO | WO 00/58761 | | 10/2000 |

OTHER PUBLICATIONS

A. Matsumoto, A. Tanaka, J. Saito, J. Nagatsuka, T. Saito, S. Niisaka, K. Sone, M. Otani, C. Ouchi, M. Hasegawa, Y. Suzuki, R. Biro, 'Low loss optical coat for 157 nm lithography', 2001 International Microprocesses and Nanotechnology Conference (IEEE Cat No. 01EX468), Shimane, Japan, Oct. 31-Nov. 2, 2001, pp. 68-69.*

* cited by examiner

ANTI-REFLECTIVE FILM AND OPTICAL ELEMENT HAVING ANTI-REFLECTIVE FILM

BACKGROUND OF THE INVENTION

1. Field of the Invention

The present invention relates to an anti-reflective film coated on a surface of an optical element and an optical element having an anti-reflective film, and particularly to an anti-reflective film effective for ultraviolet light with a wavelength of 140 to 210 nm.

2. Description of the Related Art

Generally, as an anti-reflective film in an optical element such as an optical lens, a multilayer film is used which has high-refraction films and low-refraction films stacked in layers. The larger the number of the layers, the better the anti-reflective function of the film. However, when the number of layers of an anti-reflective film is increased in order to improve the anti-reflective function, the whole thickness of the anti-reflective film increases. When the thickness of the anti-reflective film becomes large, the transmittance of the anti-reflective film will lower to degrade the function as an optical element. Particularly, when using an anti-reflective film with a low refractive index, because it is necessary to increase the number of anti-reflective layers to make larger the geometrical film thickness in order to attain a desired optical function, the transmittance will lower to degrade a function as an optical element to vacuum-ultraviolet light.

It has hitherto been known to use a fluoride film for an anti-reflective film to vacuum-ultraviolet light. U.S. Pat. No. 6,472,087 discloses an optical element using a fluoride film for an anti-reflective film, more specifically an anti-reflective film effective for an ultraviolet light of a wavelength of 190 to 250 nm obtained by employing $Al_2O_3$ as a high refractive-index layer and $AlF_3$ or $MgF_2$ as a low refractive-index layer and stacking them alternately. Further, WO 00/058761 discloses an anti-reflective film consisting of 5 to 10 layers using a fluoride film.

However, the wavelength of a light source used has become shorter and shorter in recent years, and even an $F_2$ laser of a wavelength of 157 nm has begun to be used. For this reason, an anti-reflective film effective in shorter wavelengths has been required. U.S. Pat. No. 6,472,087 mentioned above discloses an anti-reflective film effective for a wavelength within a range of 190 to 250 nm. However, the reflectance thereof is as high as 0.3% or more at a wavelength of 169 nm or less and is as high as 1% or more at a wavelength of 163 nm or less. In addition, an anti-reflective film having six layers disclosed in U.S. Pat. No. 6,472,087 above has a problem that the reflectance cannot be made low for a light. incident at such a large angle as 30 degrees or.more.

In addition, of anti-reflective films having 5 to 10 layers disclosed in WO 00/058761 above, an anti-reflective film having 6 layers also has a problem that the reflectance cannot be made low for a light incident at such a large angle as 30 degrees or more as is the case with U.S. Pat. No. 6,472,087. Moreover, for an anti-reflective film having 10 layers, the whole thickness is as very large as 3.320 $\lambda_0$. Therefore, it is believed that the transmittance to ultraviolet light is considerably low.

SUMMARY OF THE INVENTION

The present invention has been accomplished in view of the above described problems.

It is, therefore, an object of the present invention to provide an anti-reflective film of a 6-layer or 8-layer structure using fluoride thin films that is effective for a light of a wavelength of about 140 to 210 nm.

It is another object of the present invention to realize an anti-reflective film that has a low reflectance for a light incident at such a large angle as 30 degrees or more, without increasing the whole thickness of the film.

According to a first aspect of the present invention, there is provided an anti-reflective film of an eight-layer structure formed on a substrate, comprising a plurality of pairs of alternating layers comprising high refractive-index layers and low refractive-index layers having a refractive index lower than a refractive index of the high refractive-index layers, wherein the first, third, fifth, and seventh layers as counted from the substrate are the high refractive-index layers and the second, fourth, sixth, and eighth layers as counted from the substrate are the low refractive-index layers, wherein a designed central wavelength $\lambda_0$ is within a wavelength range of 141 nm to 189 nm, and wherein the first to eighth layers have optical film thicknesses d1, d2, d3, d4, d5, d6, d7, and d8 respectively, the equations of:

$0.45\lambda_0 \leq d1 \leq 0.65\lambda_0;$ $0.05\lambda_0 \leq d2 \leq 0.20\lambda_0;$ $0.29\lambda_0 \leq d3 \leq 0.49\lambda_0;$ $0.01\lambda_0 \leq d4 \leq 0.15\lambda_0;$ $0.05\lambda_0 \leq d5 \leq 0.20\lambda_0;$ $0.23\lambda_0 \leq d6 \leq 0.28\lambda_0;$ $0.23\lambda_0 \leq d7 \leq 0.28\lambda_0;$ and $0.23\lambda_0 \leq d8 \leq 0.28\lambda_0$ are satisfied.

According to a second aspect of the present invention, there is provided an anti-reflective film of a six-layer structure formed on a substrate, comprising a plurality of pairs of alternating layers comprising high refractive-index layers and low refractive-index layers having a refractive index lower than a refractive index of the high refractive-index layers, wherein the first, third, and fifth layers as counted from the substrate are the high refractive-index layers and the second, fourth, and sixth layers as counted from the substrate are the low refractive-index layers, wherein a designed central wavelength $\lambda_0$ is within a wavelength range of 143 nm to 181 nm, and wherein when the first to sixth layers have optical film thicknesses d1, d2, d3, d4, d5, and d6 respectively, the equations of:

$0.05\lambda_0 \leq d1 \leq 0.27\lambda_0;$ $0.01\lambda_0 \leq d2 \leq 0.15\lambda_0;$ $0.10\lambda_0 \leq d3 \leq 0.32\lambda_0;$ $0.23\lambda_0 \leq d4 \leq 0.29\lambda_0;$ $0.23\lambda_0 \leq d5 \leq 0.29\lambda_0;$ and $0.23\lambda_0 \leq d6 \leq 0.28\lambda_0$ are satisfied.

According to a third aspect of the present invention, there is provided an anti-reflective film of a six-layer structure formed on a substrate, comprising a plurality of pairs of alternating layers comprising high refractive-index layers and low refractive-index layers having a refractive index lower than a refractive index of the high refractive-index layers, wherein the first, third, and fifth layers as counted from the substrate are the high refractive-index layers and the second, fourth, and sixth layers as counted from the substrate are the low refractive-index layers, wherein a designed central wavelength $\lambda_0$ is within a wavelength range of 140 nm to 210 nm, and wherein when the first to sixth layers have optical film thicknesses d1, d2, d3, d4, d5, and d6 respectively, the equations of:

$0.05\lambda_0 \leq d1 \leq 0.27\lambda_0;$ $0.01\lambda_0 \leq d2 \leq 0.15\lambda_0;$ $0.10\lambda_0 \leq d3 \leq 0.32\lambda_0;$ $0.47\lambda_0 \leq d4 \leq 0.67\lambda_0;$ $0.23\lambda_0 \leq d5 \leq 0.29\lambda_0;$ and $0.23\lambda_0 \leq d6 \leq 0.28\lambda_0$ are satisfied.

In the present invention, it is preferred that the low refractive-index layer comprises at least one material selected from the group consisting of $MgF_2$, $AlF_3$, NaF, LiF, $CaF_2$, $BaF_2$, $SrF_2$, and $Na_3AlF_6$, and the high refractive-index layer comprises at least one material selected from the group consisting of $LaF_3$, $NdF_3$, $GdF_3$, $DyF_3$, $YF_3$, and $PbF_2$.

Further, in the present invention, it is also preferred that the substrate comprises quartz or calcium fluoride.

According to a fourth aspect of the present invention, there is provided an optical element having the above-mentioned anti-reflective film formed on a surface thereof.

According to a fifth aspect of the present invention, there is provided an optical system comprising at least one optical element mentioned above.

According to a sixth aspect of the present invention, there is provided an exposure system comprising an illumination optical system for illuminating a mask and a projection optical system for projecting a pattern formed on the mask onto a substrate, wherein the illumination optical system or the projection optical system comprises the above-mentioned optical system.

The above and other objects of the present invention will become more apparent from the following description taken in conjunction with the accompanying drawings.

DETAILED DESCRIPTION OF THE PREFERRED EMBODIMENTS

Example 1

Figure 1:
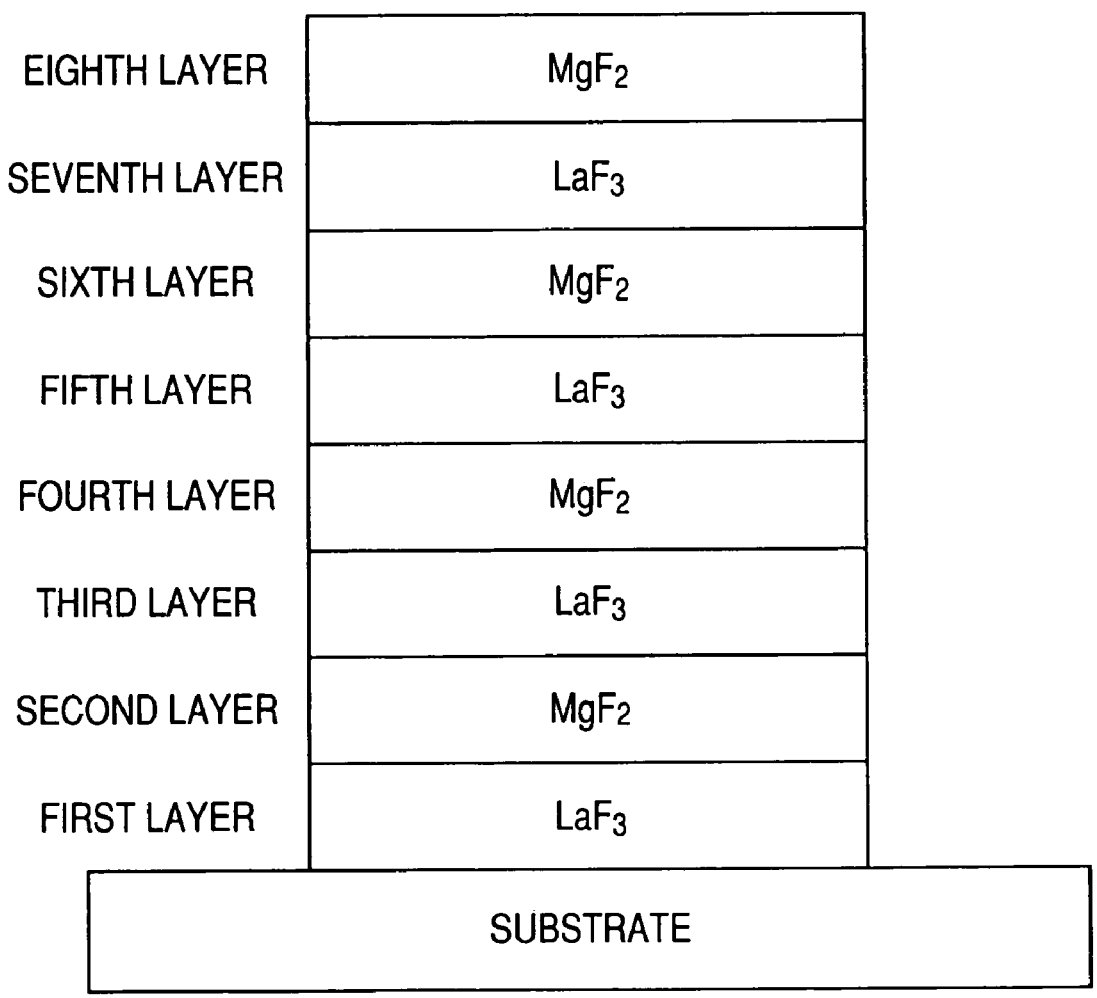
FIG. 1 is a schematic view showing an anti-reflective film comprising eight layers in accordance with Example 1.

FIG. 1 is a schematic view showing an anti-reflective film consisting of eight layers for an $F_2$ laser (157 nm) in accordance with Example 1 of the present invention. The anti-reflective film of the present example was prepared using an $LaF_3$ film with a refractive index of 1.765 at a wavelength of 157 nm for a high refractive-index layer, and an $MgF_2$ film with a refractive index of 1.466 at a wavelength of 157 nm for a low refractive-index layer. Table 1 shows the optical film thickness of each layer of the anti-reflective film for ultraviolet light with a designed central wavelength of $\lambda_0=157$ nm. The refractive-index layers were sequentially formed by use of a vacuum evaporation method so as to have the thicknesses shown in Table 1, respectively. In the present example, calcium fluoride was used as a substrate.

TABLE 1

|  | Material | Optical Film Thickness |
|---|---|---|
| Medium on light incidence side | air |  |
| Eighth layer | $MgF_2$ | $0.2588\ \lambda_0$ |
| Seventh layer | $LaF_3$ | $0.2639\ \lambda_0$ |
| Sixth layer | $MgF_2$ | $0.2614\ \lambda_0$ |
| Fifth layer | $LaF_3$ | $0.1138\ \lambda_0$ |
| Fourth layer | $MgF_2$ | $0.0569\ \lambda_0$ |
| Third layer | $LaF_3$ | $0.3907\ \lambda_0$ |
| Second layer | $MgF_2$ | $0.1094\ \lambda_0$ |
| First layer | $LaF_3$ | $0.5681\ \lambda_0$ |
| Medium on light exit side | calcium fluoride substrate |  |

Figure 2:
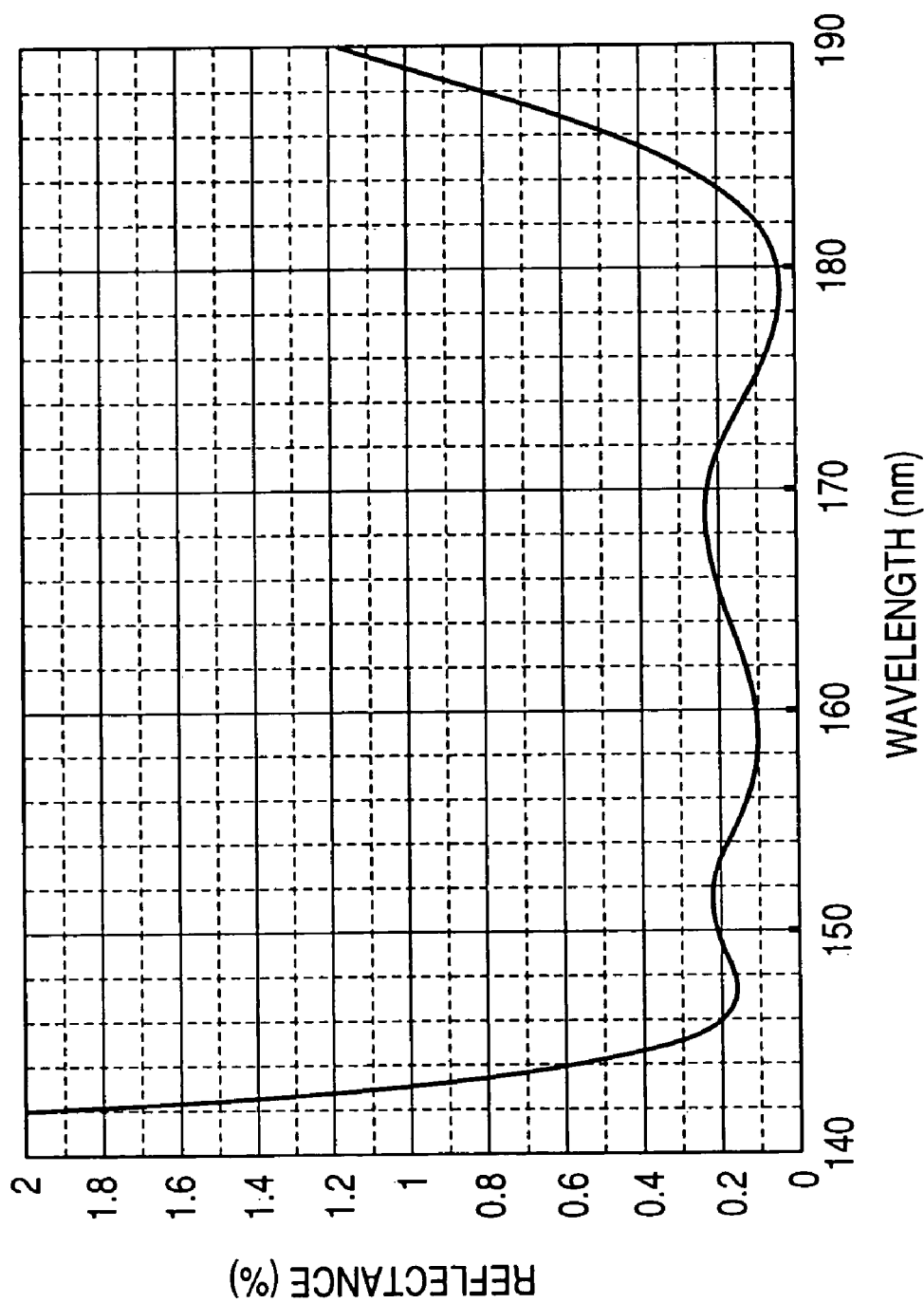
FIG. 2 is a graphical representation showing the reflectance characteristics of the anti-reflective film in accordance with Example 1.
Figure 3:
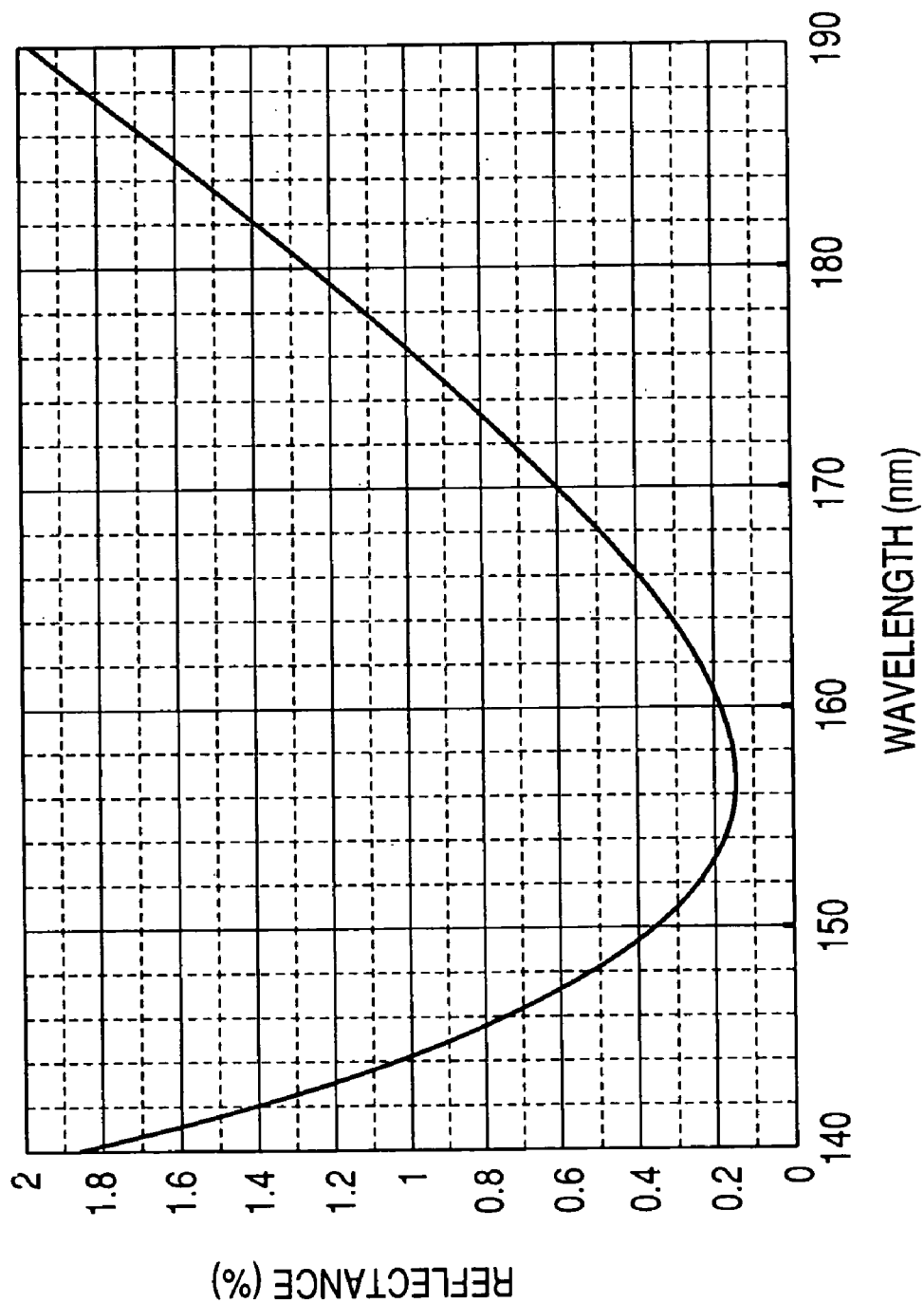
FIG. 3 is a graphical representation showing the reflectance characteristics of an anti-reflective film consisting of two layers in accordance with a comparative example.

The reflection characteristics of the anti-reflective film shown in Table 1 were measured. In addition, for the purpose of comparison, an anti-reflective film of two layers consisting of an $LaF_3$ layer and an $MgF_2$ layer each having a thickness of $0.25\lambda_0$ was also prepared following the same procedure, and the reflection characteristics were measured. FIG. 2 shows the results of the reflectance measurement of the anti-reflective film of the present example. In addition, FIG. 3 shows the results of the reflectance measurement of the anti-reflective film consisting of two layers as the comparative example. It can be seen from FIG. 2 that the anti-reflective film of the present example has good characteristics with a reflectance of 1.0% or lower within a wide wavelength range of 143 nm to 189 nm, and particularly that in a wide wavelength range of 146 nm to 184 nm, the anti-reflective film has good characteristics with a reflectance of 0.3% or lower.

In contrast to this, it can be seen from FIG. 3 that the comparative example shows good characteristics with a reflectance of 0.3% or lower within a wavelength range of 151 nm to 164 nm. However, at wavelengths of less than 151 nm or more than 164 nm, the reflectance characteristics are degraded.

Figure 4:
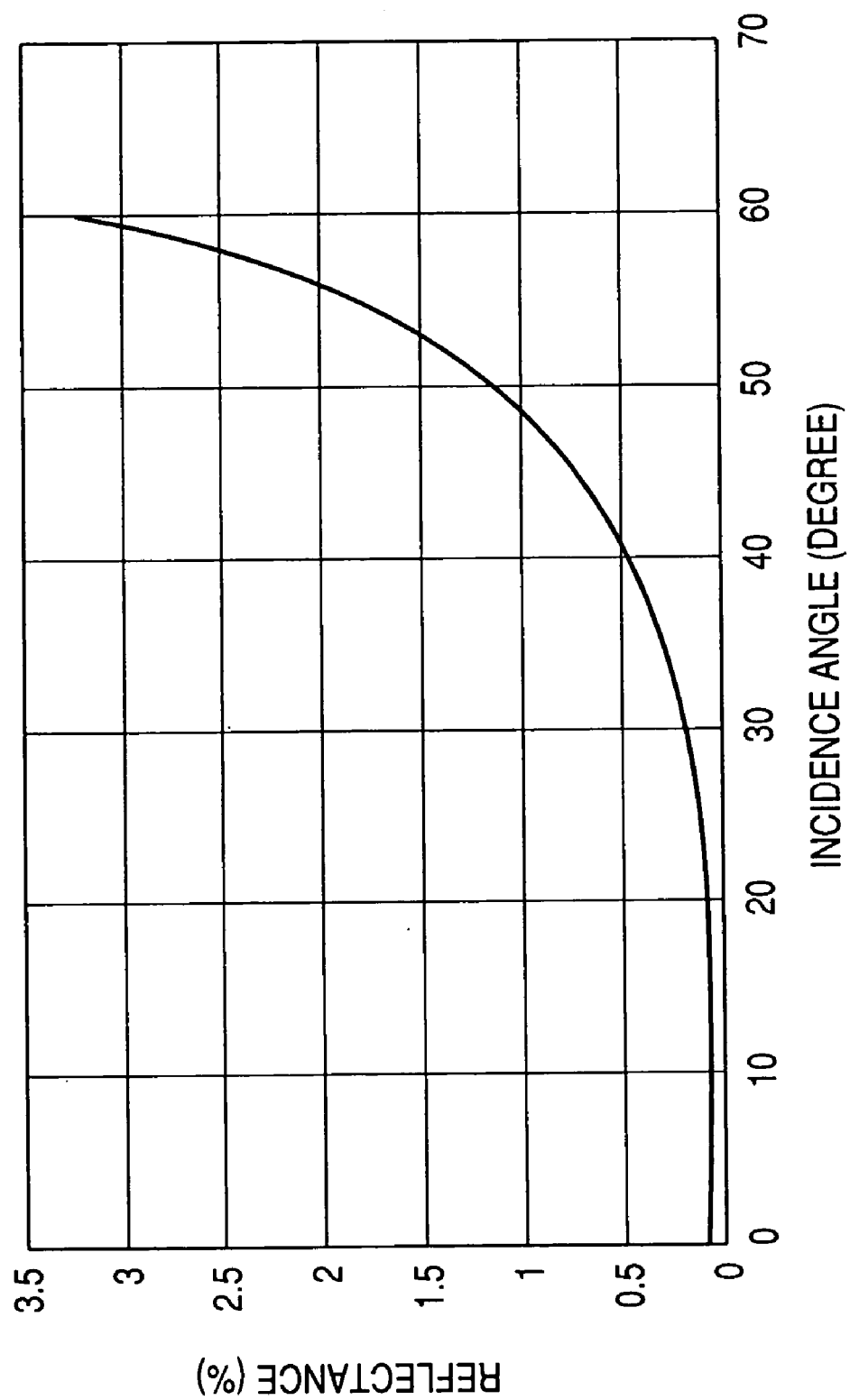
FIG. 4 is a graphical representation showing the characteristic dependency on a light incidence angle of a reflectance to a light of a wavelength of 157 nm of the anti-reflective film of Example 1.

In addition, FIG. 4 shows the results of measurement for reflectance to an $F_2$ laser of a wavelength of 157 nm at various incidence angles of the anti-reflective film of the present example. It can be seen from FIG. 4 that the anti-reflective film shows a reflectance of about 1% at an incidence angle of 50°, and therefore that the film shows good anti-reflection characteristics to a light with a large incidence angle.

Similarly, it has also been found that when a designed central wavelength $\lambda_0$ is within a wavelength range of 141 nm to 189 nm, and when the first to eighth layers as counted from the substrate have optical film thicknesses d1 to d8 respectively and satisfy the equations of:

$0.45\lambda_0 \leq d1 \leq 0.65\lambda_0;$ $0.05\lambda_0 \leq d2 \leq 0.20\lambda_0;$ $0.29\lambda_0 \leq d3 \leq 0.49\lambda_0;$ $0.01\lambda_0 \leq d4 \leq 0.15\lambda_0;$ $0.05\lambda_0 \leq d5 \leq 0.20\lambda_0;$ $0.23\lambda_0 \leq d6 \leq 0.28\lambda_0;$ $0.23\lambda_0 \leq d7 \leq 0.28\lambda_0;$ and $0.23\lambda_0 \leq d8 \leq 0.28\lambda_0$ the same effect can be exhibited.

Example 2

An anti-reflective film in accordance with the present example has a six-layer structure having high refractive-index layers and low refractive-index layers alternately stacked. The anti-reflective film was prepared using an $LaF_3$ film with a refractive index of 1.765 at a wavelength of 157 nm for a high refractive-index layer, and an $MgF_2$ film with a refractive index of 1.466 at a wavelength of 157 nm for a low refractive-index layer. Table 2 shows the optical film thickness of each layer of the anti-reflective film for ultraviolet light with a designed central wavelength of $\lambda_0=157$ nm. The refractive-index layers were sequentially formed by use of a vacuum evaporation method so as to have the thicknesses shown in Table 2, respectively. In the present example, calcium fluoride was used as a substrate.

TABLE 2

|  | Material | Optical Film Thickness |
| --- | --- | --- |
| Medium on light incidence side | air |  |
| Sixth layer | $MgF_2$ | 0.2534 $\lambda_0$ |
| Fifth layer | $LaF_3$ | 0.2645 $\lambda_0$ |
| Fourth layer | $MgF_2$ | 0.2667 $\lambda_0$ |
| Third layer | $LaF_3$ | 0.1207 $\lambda_0$ |
| Second layer | $MgF_2$ | 0.0768 $\lambda_0$ |

TABLE 2-continued

|  | Material | Optical Film Thickness |
| --- | --- | --- |
| First layer | $LaF_3$ | 0.2505 $\lambda_0$ |
| Medium on light exit side | calcium fluoride substrate |  |

Figure 5:
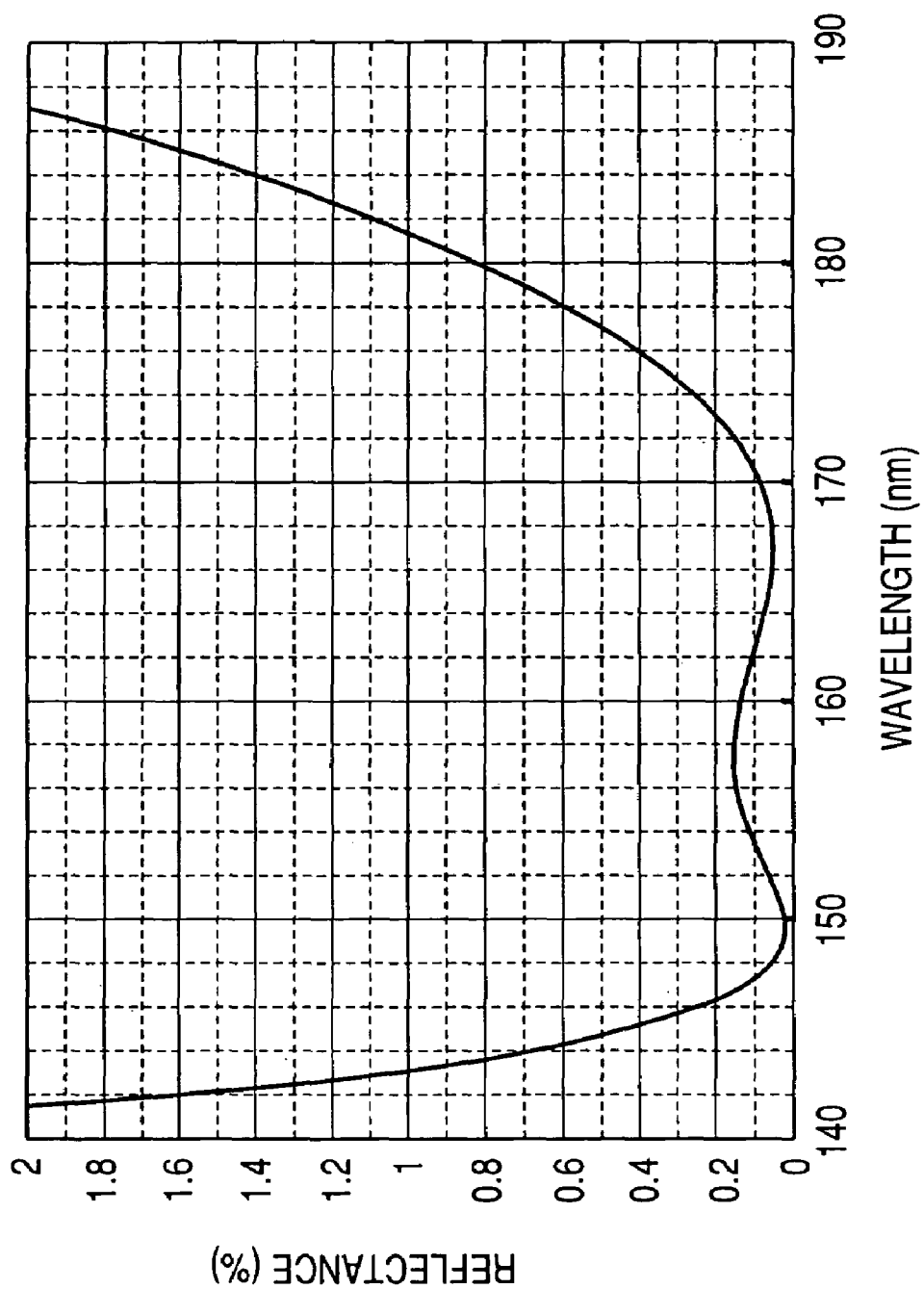
FIG. 5 is a graphical representation showing the reflectance characteristics of an anti-reflective film comprising six layers in accordance with Example 2.

The reflection characteristics of the anti-reflective film shown in Table 2 were measured. FIG. 5 shows the results of the reflectance measurement of the anti-reflective film. It can be seen from FIG. 5 that the anti-reflective film of the present example has good characteristics with a reflectance of 1.0% or lower within a wide wavelength range of 143 nm to 181 nm, and particularly that in a wide wavelength range of 146 nm to 173 nm, the anti-reflective film has good characteristics with a reflectance of 0.2% or lower.

Similarly, it has also been found that when a designed central wavelength $\lambda_0$ is within a wavelength range of 143 nm to 181 nm, and when the first to sixth layers as counted from the substrate have optical film thicknesses d1 to d6 respectively and satisfy the equations of:

$0.05\lambda_0 \leq d1 \leq 0.27\lambda_0;$ $0.01\lambda_0 \leq d2 \leq 0.15\lambda_0;$ $0.10\lambda_0 \leq d3 \leq 0.32\lambda_0;$ $0.23\lambda_0 \leq d4 \leq 0.29\lambda_0;$ $0.23\lambda_0 \leq d5 \leq 0.29\lambda_0;$ and $0.23\lambda_0 \leq d6 \leq 0.28\lambda_0$ the same effect can be exhibited.

Example 3

An anti-reflective film in accordance with the present example has a six-layer structure having high refractive-index layers and low refractive-index layers alternately stacked. The anti-reflective film was prepared using an $LaF_3$ film with a refractive index of 1.765 at a wavelength of 157 nm for a high refractive-index layer, and an $MgF_2$ film with a refractive index of 1.466 at a wavelength of 157 nm for a low refractive-index layer. Table 3 shows the optical film thickness of each layer of the anti-reflective film for ultraviolet light with a designed central wavelength of $\lambda_0=157$ nm. The refractive-index layers were sequentially formed by use of a vacuum evaporation method so as to have the thicknesses shown in Table 3, respectively. In the present example, calcium fluoride was used as a substrate.

TABLE 3

|  | Material | Optical Film Thickness |
| --- | --- | --- |
| Medium on light incidence side | air |  |
| Sixth layer | $MgF_2$ | 0.269 $\lambda_0$ |
| Fifth layer | $LaF_3$ | 0.274 $\lambda_0$ |
| Fourth layer | $MgF_2$ | 0.57 $\lambda_0$ |
| Third layer | $LaF_3$ | 0.205 $\lambda_0$ |

TABLE 3-continued

|  | Material | Optical Film Thickness |
|---|---|---|
| Second layer | MgF$_2$ | 0.079 $\lambda_0$ |
| First layer | LaF$_3$ | 0.136 $\lambda_0$ |
| Medium on light exit side | calcium fluoride substrate |  |

Figure 6:
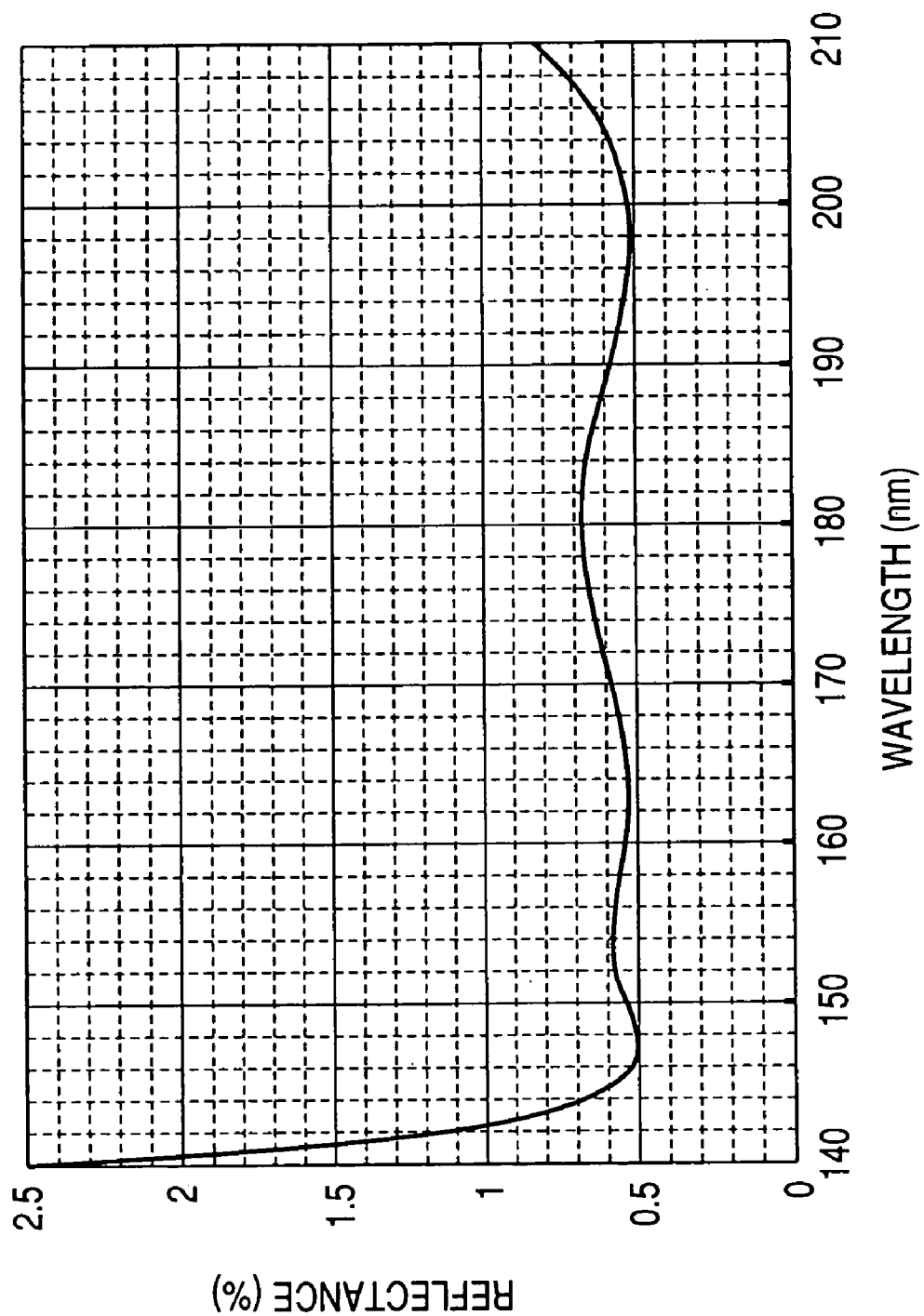
FIG. 6 is a graphical representation showing the reflectance characteristics of an anti-reflective film comprising six layers in accordance with Example 3.

The reflection characteristics of the anti-reflective film shown in Table 3 were measured. FIG. 6 shows the results of the reflectance measurement of the anti-reflective film. It can be seen from FIG. 6 that the anti-reflective film of the present example has good characteristics with a reflectance of 1.0% or lower within a wide wavelength range of 142 nm to 210 nm, and particularly that in a wide wavelength range of 144 nm to 207 nm, the anti-reflective film has good characteristics with a reflectance of 0.7% or lower.

Similarly, it has also been found that when a designed central wavelength $\lambda_0$ is within a wavelength range of 140 nm to 210 nm, and when the first to sixth layers as counted from the substrate have optical film thicknesses d1 to d6 respectively and satisfy the equations of:

$$0.05\lambda_0 \leq d1 \leq 0.27\lambda_0;$$

$$0.01\lambda_0 \leq d2 \leq 0.15\lambda_0;$$

$$0.10\lambda_0 \leq d3 \leq 0.32\lambda_0;$$

$$0.47\lambda_0 \leq d4 \leq 0.67\lambda_0;$$

$$0.23\lambda_0 \leq d5 \leq 0.29\lambda_0; \text{ and}$$

$$0.23\lambda_0 \leq d6 \leq 0.28\lambda_0$$

the same effect can be exhibited.

In Examples 1 to 3 described above, an LaF$_3$ film was used for a high refractive-index layer, and an MgF$_2$ film was used for a low refractive-index layer. However, the present invention is not limited thereto, and an NdF$_3$ film, a GdF$_3$ film, a DyF$_3$ film, a YF$_3$ film, and a PbF$_2$ film, other than an LaF$_3$ film, can also be used for a high refractive-index layer. In addition, an AlF$_3$ film, an NaF film, an LiF film, a CaF$_2$ film, a BaF$_2$ film, an SrF$_2$ film, and an Na$_3$AlF$_6$ film, other than an MgF$_2$ film, can also be used for a low refractive-index layer.

In addition, in the above described examples 1 to 3, calcium fluoride was used as a substrate, but quartz is also available.

<Example of Exposure System>

Figure 7:
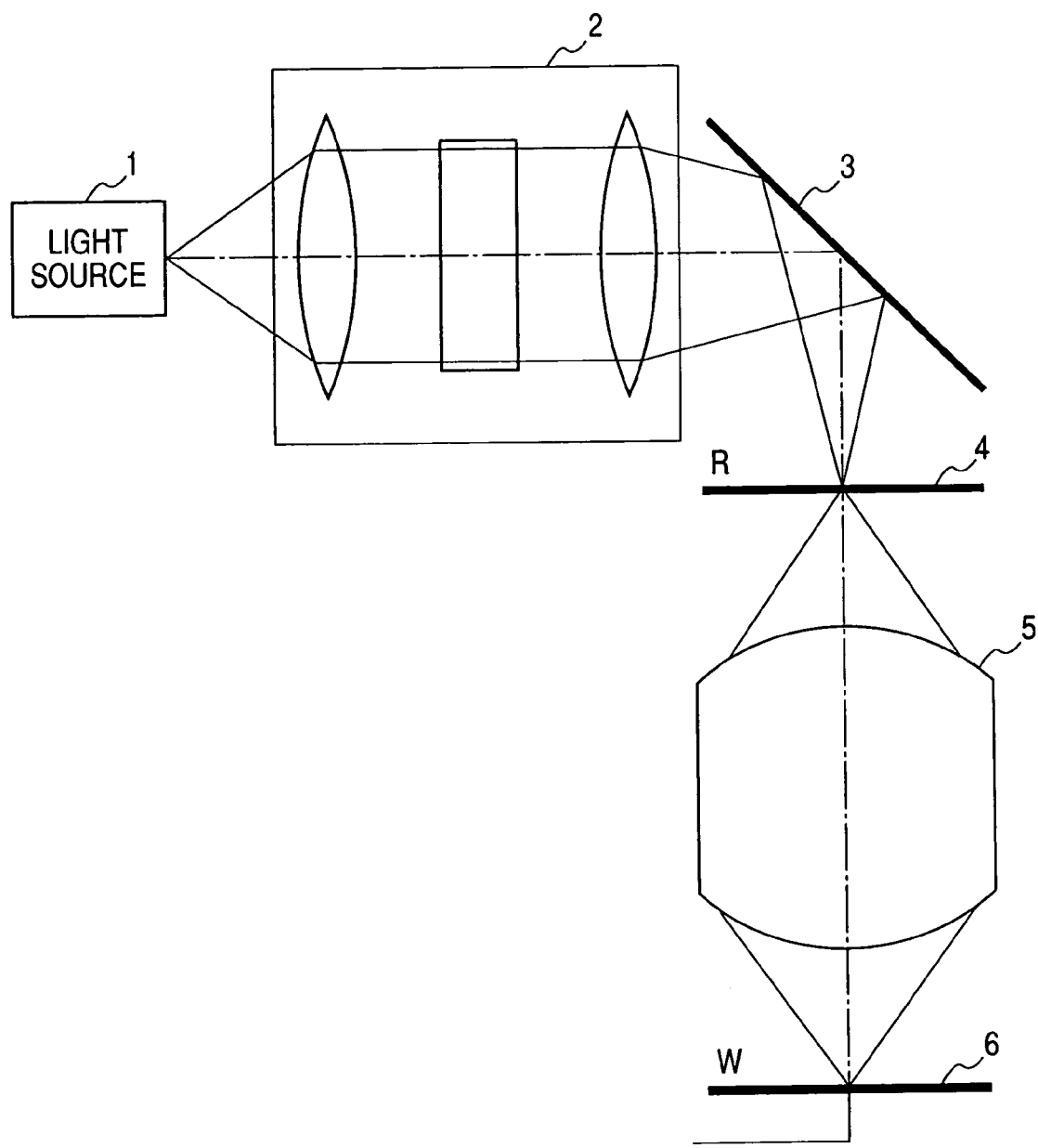
FIG. 7 is a schematic view showing an exposure system comprising an optical element having an anti-reflective film in accordance with the present invention.

FIG. 7 is a schematic view showing a main part of an exposure system (aligner) for producing a semiconductor device using an optical system. The optical system has an optical element having the anti-reflective film in accordance with Example 1, 2 or 3 described above. In the figure, reference numeral 1 denotes a light source for emitting ultraviolet light of a wavelength of 157 nm. Reference numeral 2 denotes an illumination system for illuminating a reticle 4 with a light beam from the light source 1. Reference numeral 3 denotes a mirror. Reference numeral 5 denotes a projection optical system for projecting a pattern on the reticle 4 to a wafer 6. Each of optical elements such as a lens used in the mirror 3, the illumination system 2 and the projection optical system 5 has an anti-reflective film in accordance with the present invention applied on a surface thereof. Thereby, reflection of the light beam at each surface is prevented to suppress the occurrence of a flare or ghost, thus providing an excellent projected pattern image.

<Example of Production Method of Device>

Figure 8:
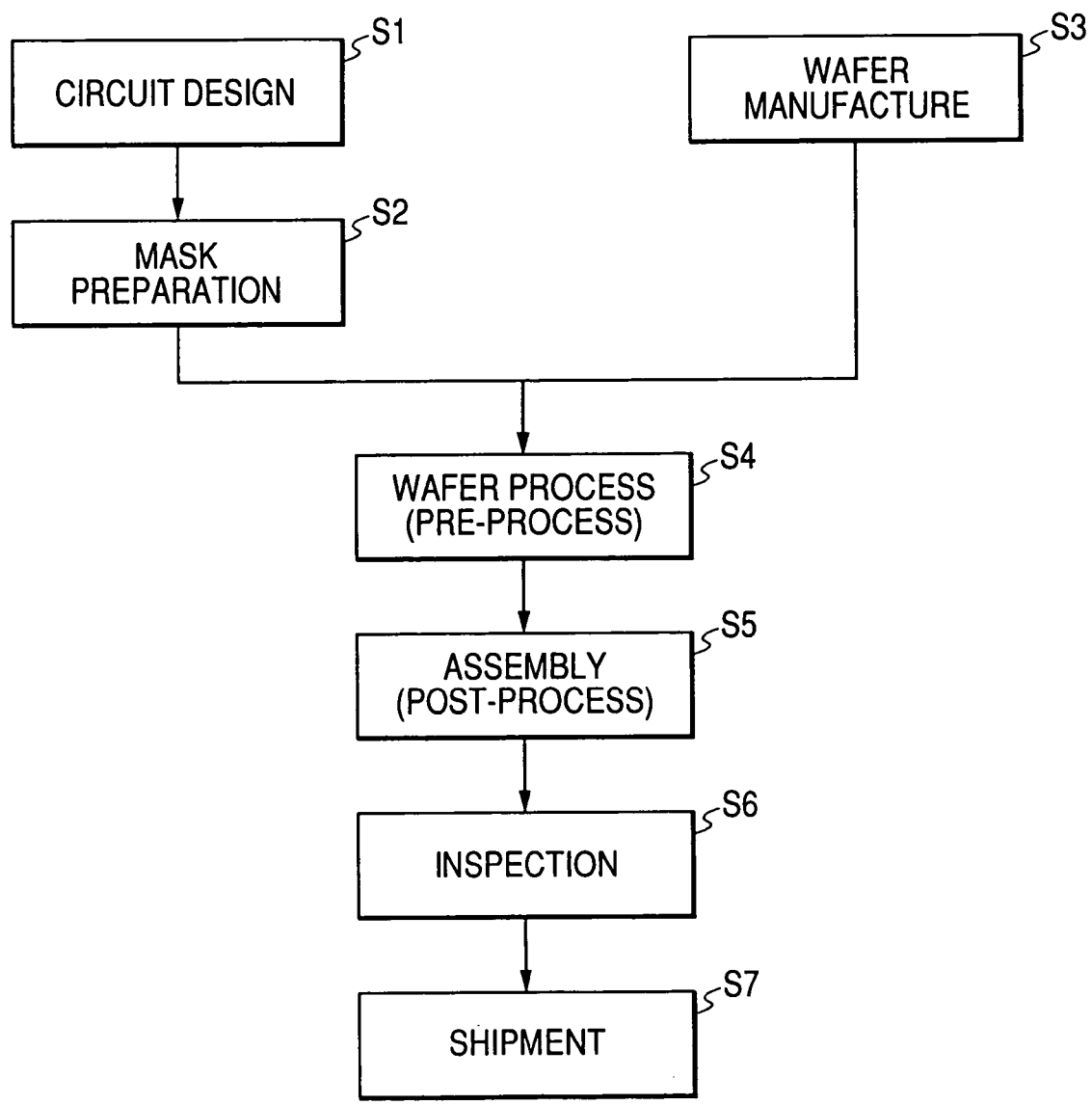
FIG. 8 is an operation flow showing a production process of a semiconductor device.

Described next is a method of producing a semiconductor device using the exposure system shown in FIG. 7. FIG. 8 shows a production flow of a semiconductor device (a semiconductor chip such as an IC or LSI, a liquid crystal panel or a CCD). In Step 1 (circuit design), a circuit of a semiconductor device is designed. In Step 2 (mask production), a mask (a reticle 4) having the designed circuit pattern formed thereon is prepared. On the other hand, in Step 3 (wafer manufacture), a wafer (wafer 6) is manufactured using a material such as silicon or the like. In Step 4 (wafer processing) which is called a pre-process, an actual circuit is formed on the wafer using the above prepared mask and the wafer by means of lithography. Next, Step 5 (assembly), which is called a post-process, is a step of making a chip by the use of the wafer prepared in Step 4 and includes an assembling step (dicing and bonding), a packaging step (chip encapsulation) and the like. In Step 6 (inspection), the semiconductor device produced in Step 5 is subjected to tests such as an operation check test and a durability test. A semiconductor device is thus completed through the above steps and is shipped (Step 7).

Figure 9:
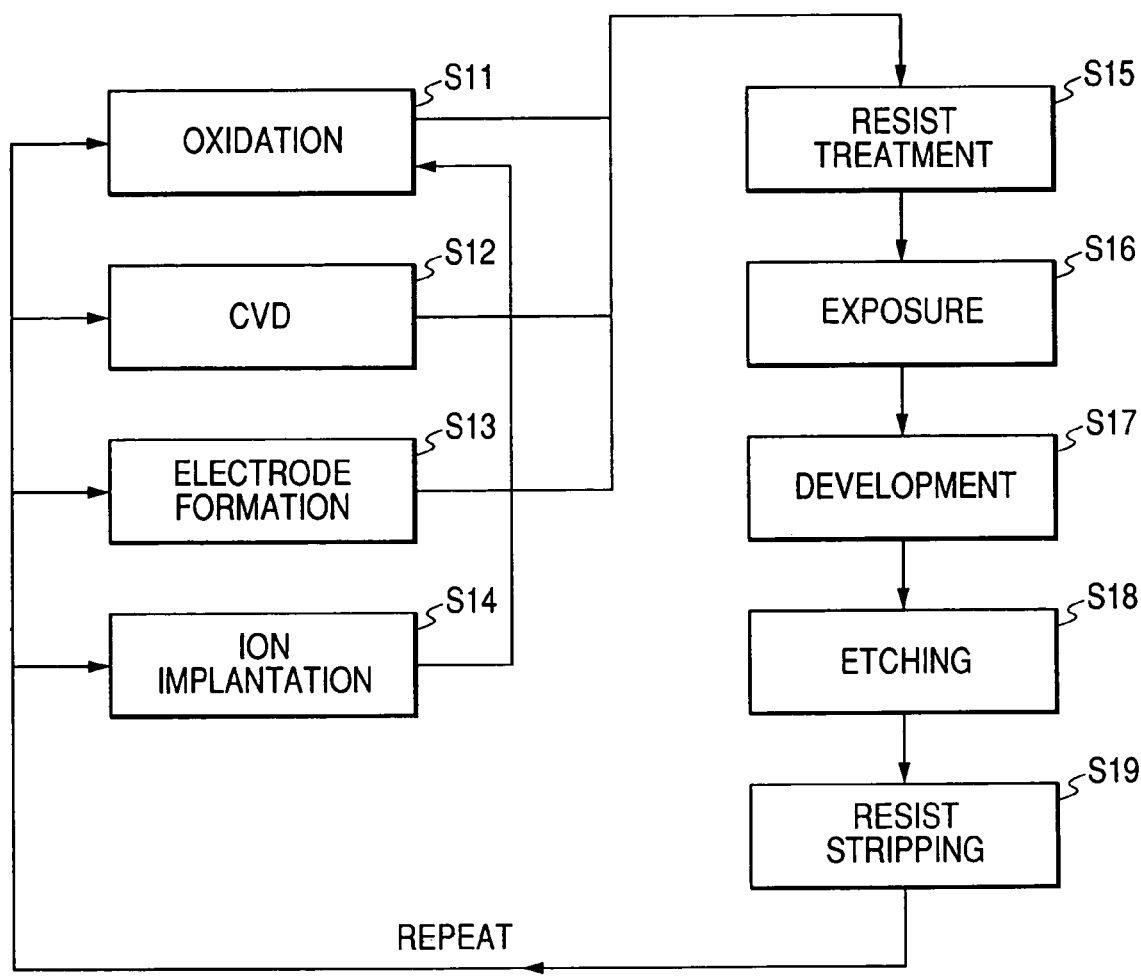
FIG. 9 is an operation flow showing details of wafer processing in production steps of a semiconductor device.

FIG. 9 shows a detailed flow of the above described wafer process. In Step 11 (oxidation), the surface of the wafer (wafer W) is oxidized. In Step 12 (CVD), an insulation film is formed on the surface of the wafer. In Step 13 (electrode formation), an electrode is formed on the wafer through vapor deposition. In Step 14 (ion implantation), ions are implanted into the wafer. In Step 15 (resist treatment), a resist (sensitized material) is applied to the wafer. In Step 16 (exposure), the wafer is exposed through an image of a circuit pattern of the mask (reticle 4) with the exposure system. In Step 17 (development), the exposed wafer is developed. In Step 18 (etching), a portion except for a developed resist portion is removed. In Step 19 (resist stripping), the resist is removed which has become unnecessary after completion of the etching step. A circuit pattern is formed on the wafer by repeating these steps.

As described above, according to the present invention, there can be provided an anti-reflective film of a 6-layer or 8-layer structure using fluoride thin films that is effective for a light of a wavelength of about 140 to 210 nm. Further, it is possible to realize an anti-reflective film that has a low reflectance for a light incident at such a large angle as 30 degrees or more, without increasing the whole thickness of the film.

This application claims priority from Japanese Patent Application No. 2004-178534 filed on Jun. 16, 2004, which is hereby incorporated by reference herein.

What is claimed is:

1. An anti-reflective film of an eight-layer structure formed on a substrate, comprising a plurality of pairs of alternating layers comprising high refractive-index layers and low refractive-index layers having a refractive index lower than a refractive index of the high refractive-index layers, wherein the first, third, fifth, and seventh layers as counted from the substrate are the high refractive-index layers and the second, fourth, sixth, and eighth layers as counted from the substrate are the low refractive-index layers, wherein a designed central wavelength $\lambda_0$ is within a wavelength range of 141 nm to 189 nm, and wherein when the first to eighth layers have optical film thicknesses d1, d2, d3, d4, d5, d6, d7, and d8 respectively, the equations of:

$$0.45\lambda_0 \leq d1 \leq 0.65\lambda_0;$$

$$0.05\lambda_0 \leq d2 \leq 0.20\lambda_0;$$

$$0.29\lambda_0 \leq d3 \leq 0.49\lambda_0;$$

$$0.01\lambda_0 \leq d4 \leq 0.15\lambda_0;$$

$$0.05\lambda_0 \leq d5 \leq 0.20\lambda_0;$$

$$0.23\lambda_0 \leq d6 \leq 0.28\lambda_0;$$

$$0.23\lambda_0 \leq d7 \leq 0.28\lambda_0; \text{ and}$$

$$0.23\lambda_0 \leq d8 \leq 0.28\lambda_0$$

are satisfied.

2. The anti-reflective film according to claim 1, wherein the low refractive-index layer comprises at least one material selected from the group consisting of $MgF_2$, $AlF_3$, NaF, LiF, $CaF_2$, $BaF_2$, $SrF_2$, and $Na_3AlF_6$, and the high refractive-index layer comprises at least one material selected from the group consisting of $LaF_3$, $NdF_3$, $GdF_3$, $DyF_3$, $YF_3$, and $PbF_2$.

3. The anti-reflective film according to claim 1, wherein the substrate comprises quartz or calcium fluoride.

4. An optical element having the anti-reflective film set forth in claim 1 formed on a surface thereof.

5. An optical system comprising at least one optical element set forth in claim 4.

6. An exposure system comprising an illumination optical system for illuminating a mask and a projection optical system for projecting a pattern formed on the mask onto a substrate, wherein the illumination optical system or the projection optical system comprises the optical system set forth in claim 5.

* * * * *